(12) United States Patent
Yamaji et al.

(10) Patent No.: US 6,554,020 B2
(45) Date of Patent: Apr. 29, 2003

(54) FLUID CONTROL APPARATUS

(75) Inventors: Michio Yamaji, Osaka (JP); Tsutomu Shinohara, Osaka (JP); Ichiro Mine, Osaka (JP); Izuru Shikata, Osaka (JP); Kenji Tsubota, Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 10/176,548

(22) Filed: Jun. 24, 2002

(65) Prior Publication Data

US 2003/0005959 A1 Jan. 9, 2003

(30) Foreign Application Priority Data

Jul. 5, 2001 (JP) ......................................... 2001-204199

(51) Int. Cl.[7] ............................................... F16K 49/00
(52) U.S. Cl. .................... 137/341; 137/884; 248/222.12
(58) Field of Search ................................ 137/341, 883, 137/884; 248/222.12; 118/728

(56) References Cited

U.S. PATENT DOCUMENTS

| | | | |
|---|---|---|---|
| 4,094,483 A | 6/1978 | Busch | 248/73 |
| 4,396,824 A * | 8/1983 | Fiegl et al. | 137/341 |
| 4,802,263 A | 2/1989 | Lorber | 24/67.5 |
| 5,455,014 A * | 10/1995 | Constantino et al. | 137/341 |
| 5,915,444 A * | 6/1999 | Seaman et al. | 137/883 |
| 6,129,108 A * | 10/2000 | Peng et al. | 137/828 |

FOREIGN PATENT DOCUMENTS

| | | |
|---|---|---|
| EP | 0 863 348 A2 | 9/1998 |
| GB | 822821 A | 11/1959 |
| GB | 2 156 191 A | 10/1985 |

* cited by examiner

*Primary Examiner*—A. Michael Chambers
(74) *Attorney, Agent, or Firm*—Armstrong, Westerman & Hattori, LLP.

(57) ABSTRACT

A pair of tape heaters 11 are arranged respectively on opposite sides of at least one line and held to the corresponding coupling members by a plurality of clips 12. Each of the clips 12 comprises a pair of side walls 13 opposed to each other as spaced apart by a predetermined distance, and a connecting wall 14 interconnecting the pair of side walls 13 at an intermediate portion of the height thereof so as to move lower portions of the side walls 13 away from each other when upper portions of the side walls 13 are subjected to a force acting to move the upper portions toward each other and to restore the side walls 13 to the original state when the force is removed.

3 Claims, 3 Drawing Sheets

FLUID CONTROL APPARATUS

BACKGROUND OF THE INVENTION

The present invention relates to fluid control apparatus for use in semiconductor manufacturing equipment or the like, and more particularly to fluid control apparatus which can be heated.

Fluid control apparatus for use in semiconductor manufacturing equipment comprise a plurality of rows of various fluid control devices, with fluid control devices of adjacent rows interconnected by coupling means at specified locations. With such fluid control apparatus, massflow controllers, on-off valves, etc. are integrated into an assembly without using tubes in recent years (see, for example, JP-A No. 9-29996/1997). FIG. 4 is a plan view showing such an example. The illustrated fluid control apparatus has five lines P1, P2, P3, P4, P5 having no bypass channels, and three lines Q1, Q2, Q3 having a bypass channel, i.e., eight lines in total. The lines P1, P2, P3, P4, P5 having no bypass channels each comprise a massflow controller 91, an on-off valve 92 disposed at the inlet side of the controller with a filter 93 interposed therebetween, and an on-off valve 94 at the outlet side of the controller. The lines Q1, Q2, Q3 having a bypass channel each comprise a massflow controller 91, two on-off valves 95, 96 arranged at the inlet side of the controller with a filter 93 interposed therebetween, two on-off valves 97, 98 arranged at the outlet side of the controller, and bypass piping 99 having an on-off valve 99a for interconnecting the inlet-side coupling of the controller 91 and the outlet-side coupling thereof. The fluid control apparatus is assembled by fastening coupling members (not shown), such as block couplings, to a base plate 100 with screws and mounting fluid control devices 91, 92, 93, 94, 95, 96, 97, 98, such as massflow controllers, filters, on-off valves, etc., each on one or at least two of these coupling members.

On the other hand, JP-A No. 10-246356/1998 discloses a heating device for use with such a fluid control apparatus for preventing condensation and for preventing reliquefaction of a gas as converted from a fluid which is liquid at room temperature. The disclosed device comprises a tape heater to be provided on at least one of opposite sides of the line, and a plurality of brackets each having a bottom wall to be fastened to the base plate with screws and a side wall for holding the tape heater in contact with each fluid control device. The bottom wall of each bracket has screw holes for use in fastening the bracket to the base plate adjustably in position.

The conventional heating device has the advantage that even when the fluid control apparatus has indentations or projections when seen from above, the tape heater can be positioned along the fluid control devices to uniformly heat the control devices without being influenced by the indentations or projections. However, the base plate needs to have portions for fastening thereto the bottom walls of the brackets, so that an increased area of installation must be given to the base plate, accordingly to the control apparatus, for the use of the heating device. On the other hand, the increase in the area of installation is not desirable for the integration of the fluid control apparatus. The installation of the heating device therefore involves the problem the increase in the area of installation must be minimized. The fluid control apparatus as integrated further has the problem that since the lines are arranged at a small spacing, the conventional heating device also has the problem of necessitating a very cumbersome procedure for fastening the brackets as adjusted in position to the base plate with screws.

SUMMARY OF THE INVENTION

An object of the present invention is to provides a fluid control apparatus equipped with a heating device which apparatus is diminished in the increase of area of installation due to the provision of the heating device.

The present invention provides a fluid control apparatus comprising a plurality of lines arranged in parallel on a base member, each of the lines comprising a plurality of fluid control devices arranged at an upper level and a plurality of block coupling members arranged at a lower level. The fluid control apparatus is characterized in that a pair of tape heaters are arranged respectively on opposite sides of at least one of the lines and held to the corresponding coupling members by a plurality of clips, each of the clips comprising a pair of side walls opposed to each other as spaced apart by a predetermined distance, and a connecting wall interconnecting the pair of side walls at an intermediate portion of the height thereof so as to move lower portions of the side walls away from each other when upper portions of the side walls are subjected to a force acting to move the upper portions toward each other and to restore the side walls to the original state when the force is removed.

The connecting wall may be straight or may have at least one projecting or indented intermediate portion. Preferably, the connecting wall is joined to the side walls so as to be deformable relative to the side walls, and the centers of the joints are positioned on a line through the centers of the opposite side walls. The lower ends of the side walls are then moved away from each other to follow the movement of the upper portions of the side walls when the upper wall portions are brought toward each other.

According to the invention, the pair of tape heaters are arranged on opposite sides of the line which needs to be heated, and the clips are caused to be held to the corresponding coupling members by gripping the upper portions of side walls of each clip with hand, fitting the side walls to opposite sides of the line from above at a required position while moving the upper portions toward each other by the application of a force thereto and thereafter releasing the clip from the hand to restore the side walls to the original state. The required line can then be heated. The heating device can therefore be installed by a very simple procedure since there is no need to fasten the heater holding brackets to the base plate with screws. Moreover, the increase in the area of installation can be very small. The heating device is also easy to install since the clips can be handled from above the line.

According to an embodiment, each of the side walls comprises a heater holding portion generally rectangular and in contact with the tape heater, an upward projection extending upward from a top midportion of the heater holding portion, and a generally L-shaped grip extending from an intermediate portion of the upward projection, the connecting wall interconnecting upper ends of the upward projections of the pair of side walls. The side walls are interconnected by the connecting wall so as to be positioned in parallel to each other when free of any external force. The joints between the connecting wall and the upper ends of the upward projections have a relatively small area, so that when the grips are held by hand, the heater holding portions are opened with their lower ends positioned away from each other, and an elastic force is produced which acts to restore the opened portions to the original state. When the grips are released from the hand, the tape heaters are pressed against the coupling member by the heater holding portions. Accordingly, the grips can be so positioned as to be free of interference with the fluid control device and are easy to hold by fingers.

Preferably, the clip is made from a thin metal plate integrally. The above construction of the side wall makes it possible to prepare the clip from a single thin metal plate. This serves to reduce the number of components.

According to the embodiment, the connecting wall comprises a body extending horizontally, and a bent portion provided at each of opposite ends of the body, and the bent portion has an end joined to the upper end of the upward projection. The heater holding portions can then be easily so opened as to position their lower ends away from each other, by holding the grips with fingers, while an elastic force for restoring the holding portions to the original state becomes readily available.

DESCRIPTION OF THE PREFERRED EMBODIMENT

An embodiment of the invention will be described below with reference to the drawings.

Figure 1:
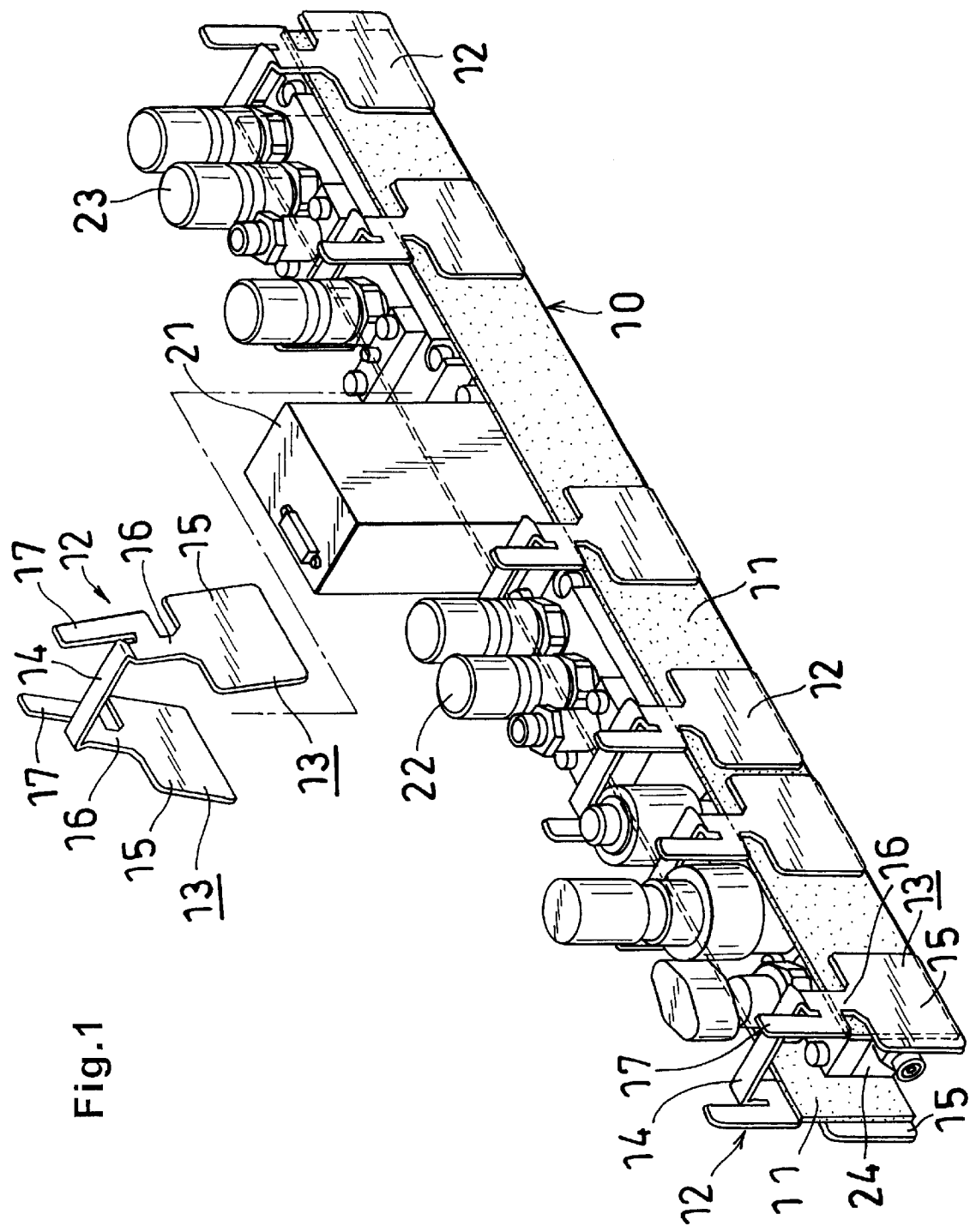
FIG. 1 is a perspective view showing a fluid control apparatus according to the invention.
Figure 4:
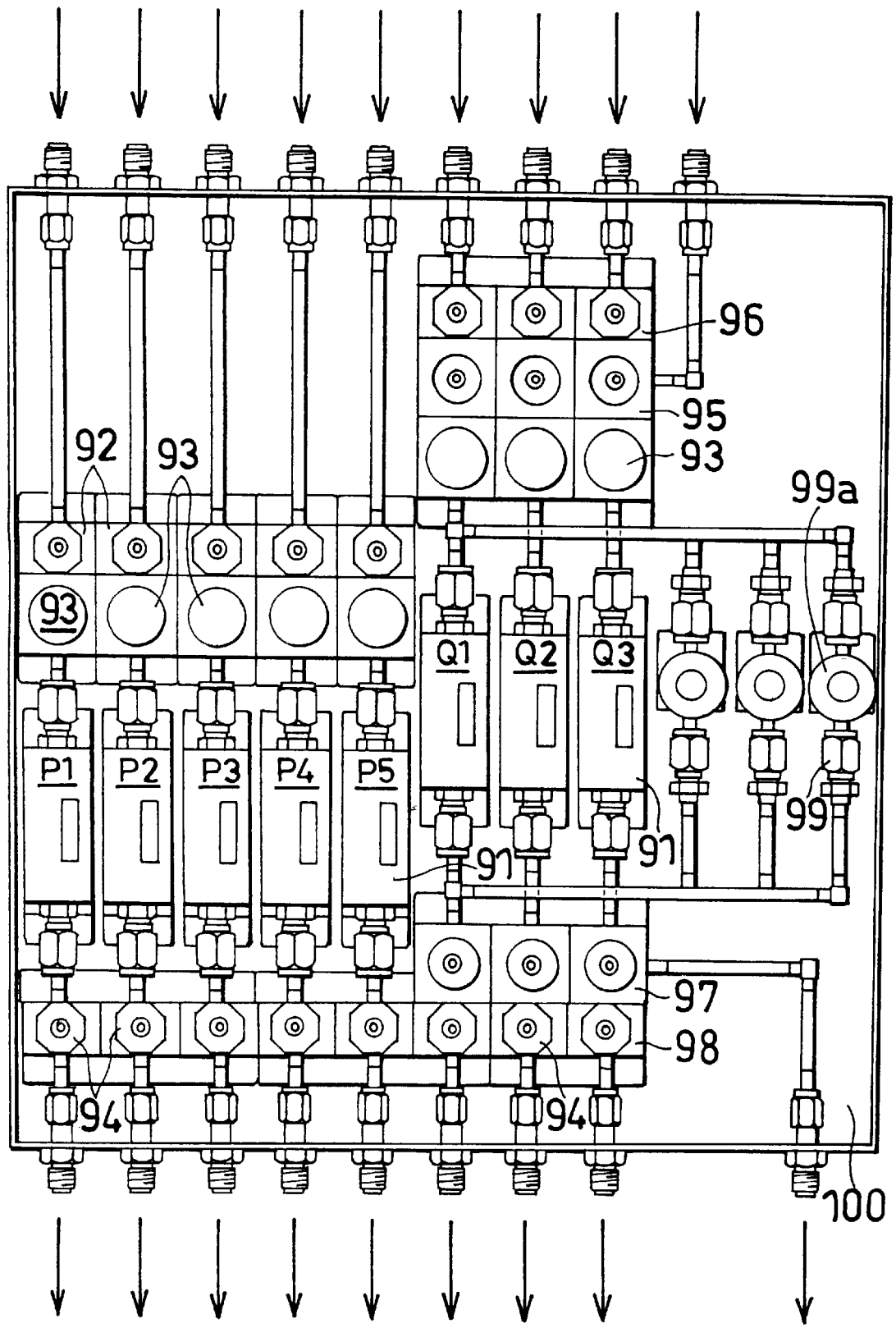
FIG. 4 is a plan view showing a conventional control apparatus.

Like an example shown in FIG. 4, the fluid control apparatus of the invention comprises a plurality of lines arranged in parallel on a base plate. At least one of the lines is provided with a heating device 10 as shown in FIG. 1. FIG. 1 shows a massflow controller 21, on-off valves or the like which are disposed at the inlet or outlet of the controller, and block coupling members 24 for holding fluid control devices 21, 22, 23, such as mass flow controller, on-off valves, etc., in communication with one another.

The heating device 10 comprises a pair of tape heaters 11 arranged respectively on opposite sides of one of the lines, and a plurality of clips 12 for holding the tape heaters 11 to the coupling members.

Each of the clips 12 is made form a thin metal plate and comprises a pair of side walls 13 opposed to each other as spaced apart by a predetermined distance, and a connecting wall 14 serving as connecting means for interconnecting the pair of side walls 13 so as to move the lower portions of the side walls 13 away from each other when the upper portions of the side walls 13 are subjected to a force acting to move the upper portions toward each other and to restore the side walls 13 to the original state when the force is removed.

Each of the side walls 13 comprises a heater holding portion 15 generally rectangular and to be in contact with the tape heater 11, an upward projection 16 extending upward from the top midportion of the heater holding portion 15, and a generally L-shaped grip 17 extending from an intermediate portion of the upward projection 16.

Figure 2:
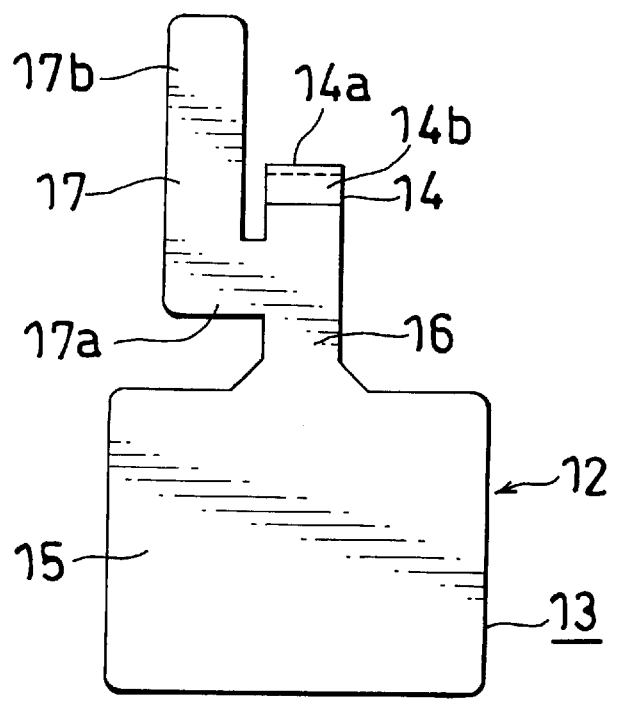
FIG. 2 is a front view of a clip.
Figure 3:
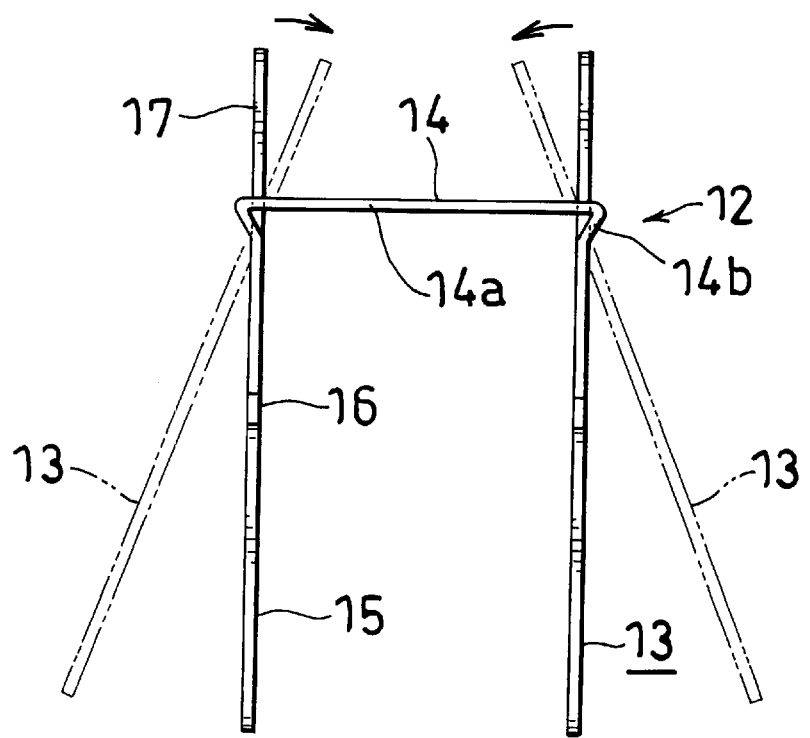
FIG. 3 is a side elevation of the clip.

As shown in FIGS. 2 and 3 on an enlarged scale, the grip 17 comprises a horizontal portion 17a extending forward or rearward from the intermediate portion of the upward projection 16, and a vertical portion 17b extending upward from the outer end of the horizontal portion 17a. The length of the horizontal portion 17a is so determined that the vertical portion 17b will not be positioned outwardly of the heater holding portion 15, and the vertical portion 17b has an upper end extending upward beyond the upward projection 16.

The connecting wall 14 comprises a body 14a extending horizontally, and a bent portion 14b having an acute angle and provided at each of opposite ends of the body 14a. The bent portion 14b has an end joined to the upper end of the upward projection 16.

What is claimed is:

1. A fluid control apparatus comprising a plurality of lines arranged in parallel on a base member, each of the lines comprising a plurality of fluid control devices (21) (22)(23) arranged at an upper level and a plurality of block coupling members (24) arranged at a lower level, the fluid control apparatus being characterized in that a pair of tape heaters (11) are arranged respectively on opposite sides of at least one of the lines and held to the corresponding coupling members by a plurality of clips (12), each of the clips (12) comprising a pair of side walls (13) opposed to each other as spaced apart by a predetermined distance, and a connecting wall (14) interconnecting the pair of side walls (13) at an intermediate portion of the height thereof so as to move lower portions of the side walls (13) away from each other when upper portions of the side walls (13) are subjected to a force acting to move the upper portions toward each other and to restore the side walls (13) to the original state when the force is removed.

2. A fluid control apparatus according to claim 1 wherein each of the side walls (13) comprises a heater holding portion (15) generally rectangular and in contact with the tape heater (11), an upward projection (16) extending upward from a top midportion of the heater holding portion (15), and a generally L-shaped grip (17) extending from an intermediate portion of the upward projection (16), the connecting wall (14) interconnecting upper ends of the upward projections (16) of the pair of side walls (13).

3. A fluid control apparatus according to claim 2 wherein the connecting wall (14) comprises a body (14a) extending horizontally, and a bent portion (14b) provided at each of opposite ends of the body (14a), and the bent portion (14b) has an end joined to the upper end of the upward projection (16).

* * * * *